United States Patent [19]

Jejelowo et al.

[11] Patent Number: 5,422,325
[45] Date of Patent: Jun. 6, 1995

[54] SUPPORTED POLYMERIZATION CATALYSTS, THEIR PRODUCTION AND USE

[75] Inventors: Moses O. Jejelowo, Kingwood; Robert L. Bamberger, Crosby, both of Tex.

[73] Assignee: Exxon Chemical Patents Inc., Linden, N.J.

[21] Appl. No.: 122,213

[22] Filed: Sep. 17, 1993

[51] Int. Cl.$^6$ .............................. C08F 4/24; C08F 4/64
[52] U.S. Cl. ................................ 502/104; 502/103; 502/117; 502/120; 502/152; 502/154; 526/160
[58] Field of Search ............... 502/103, 104, 117, 120, 502/152, 154

[56] References Cited

U.S. PATENT DOCUMENTS 5,281,679  1/1994  Jejelowo et al. ................ 526/114

FOREIGN PATENT DOCUMENTS 0279863    8/1988  European Pat. Off. .
0279863B1  8/1988  European Pat. Off. .

Primary Examiner—David W. Wu
Attorney, Agent, or Firm—Jaimes Sher

[57] ABSTRACT

This invention is generally directed toward a supposed catalyst system useful for polymerizing olefins. The method for supposing the catalyst of the invention provides for a supposed metallocene catalyst able to produce polymers having broader molecular weight distribution and a higher molecular weight. Not only are such polymers easily processable as compared with metallocene polymers produced with other support methods but the methods of this invention provides for a supposed catalyst with increased activity.

9 Claims, 2 Drawing Sheets

EXAMPLE 7. (COMPARATIVE)

MONOMER UPTAKE

TIME

MIR = 19.8
MWD = 3.0

{(SILICA + MAO)} + METALLOCENE

CORE
COATING

EXAMPLE 8 (INVENTION)

MONOMER UPTAKE

TIME

MIR = 32.0
MWD = 4.9

{(SILICA + TMA) + METALLOCENE} + MAO

CORE
COATING

SUPPORTED POLYMERIZATION CATALYSTS, THEIR PRODUCTION AND USE

FIELD OF THE INVENTION

This invention relates to catalysts, catalyst systems and to methods for their production and use in olefin polymerization. The invention particularly relates to a process for preparing a supported metallocene catalyst for use in the gas phase, slurry phase or liquid/solution phase polymerization of olefins.

BACKGROUND OF THE INVENTION

Commercial polyethylenes generally fall into one of two general categories based on their processability and their product properties.

Processability is the ability to predict and economically process and shape a polymer uniformly. Processability involves such elements as thermal stability, how easily the polymer flows, melt strength, and whether or not the extrudate is distortion free. Linear polyethylene (LPE) is more difficult to process than low density polyethylenes (LDPE) because LPE's are not as thermally stable, LPE's require more motor power and produce higher extruder pressures to match the extrusion rate of LDPE's. LPE's also have lower melt strength which, for example, adversely affects bubble stability during blown film extrusion, and they are prone to melt fracture at commercial shear rates. On the other hand, however, LPE's exhibit superior physical properties as compared to LDPE's.

In order to take advantage of the superior physical and mechanical properties of LPE's, expensive antioxidants and processing aids must be added to the polymer, and extrusion equipment must be modified to achieve commercial extrusion rates.

It is common practice in the industry to add low levels of an LDPE to an LPE to increase melt strength, to increase shear sensitivity, i.e., to increase flow at commercial shear rates; and to reduce the tendency to melt fracture. However, these blends generally have poor mechanical properties as compared with neat LPE.

A second technique to improve the processability of LPE's is to broaden the products' molecular weight distribution (MWD) by blending two or more LPE's with significantly different molecular weights, or by changing to a polymerization catalyst which produces broad MWD. The physical and mechanical properties of these broader MWD products are also similar to a single LPE component with equivalent weight-average molecular weight, however, the processability of these products is inferior to LDPE/LPE blends.

It is desirable in many polymerization processes, particularly a gas phase process, to use a supported catalyst. Supported metallocene-alumoxane catalysts have been described in various issued U.S. Patents. U.S. Pat. No. 4,937,217 generally describes a mixture of trimethylaluminum and triethylaluminum added to an undehydrated silica then adding a metallocene to form a dry catalyst. EP-308177-B1 generally describes adding a wet monomer to a reactor containing a metallocene, trialkylaluminum and undehydrated silica. U.S. Pat. Nos. 4,912,075, 4,935,937 and 4,937,301 generally relate to adding trimethylaluminum to an undehydrated silica and then adding a metallocene to form a supported catalyst. Similarly, U.S. Pat. Nos. 5,008,228, 5,086,025 and 5,147,949 generally describe forming a dry supported catalyst by the addition of trimethylaluminum to a water impregnated silica then adding the metallocene. U.S. Pat. No. 4,914,253 describes adding trimethylaluminum to undehydrated silica, adding a metallocene and then drying the catalyst with an amount of hydrogen to produce a polyethylene wax. U.S. Pat. Nos. 4,808,561 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. Lastly, U.S. Pat. No. 5,240,894 generally pertains to forming a supported metallocene/alumoxane catalyst system by forming a metallocene/alumoxane reaction solution, adding a porous carrier, evaporating the resulting slurry to remove residual solvent from the carrier.

Traditionally, metallocene catalysts produce polymers having a narrow molecular weight distribution and a high molecular weight. Narrow molecular weight distribution polymers tend to be more difficult to process. The broader the polymer molecular weight distribution the easier the polymer is to process. Typically metallocene polymers are blended with other polymers or two or more metallocene catalysts are used or certain substituted metallocene catalysts are used to broaden molecular weight distribution.

A need exists in the industry for a metallocene catalyst and method for supporting this catalyst to produce more easily processable polymers having a broader molecular weight distribution with uniform comonomer distribution.

BRIEF DESCRIPTION OF THE DRAWINGS

The foregoing aspects, features and advantages of the invention will become clearer and more fully understood when the following detailed description is read in conjunction with the accompanying figures, in which.

SUMMARY OF THE INVENTION

Figure 1A:
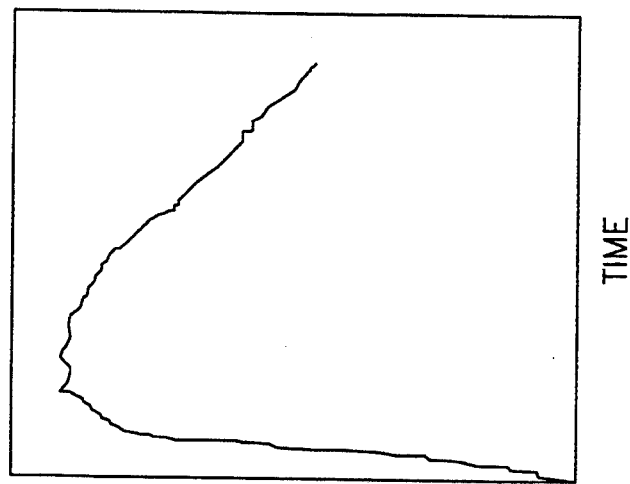
FIG. 1 is a graph illustrating the performance of the present invention as compared to the art.

This invention is generally directed toward the polymerization of olefins, optionally with a comonomer in the presence of a supported metallocene catalyst to produce a polymer product having broad molecular weight distribution. The invention also relates in one embodiment to a method for forming a metallocene catalyst providing for polymer of a broader molecular weight distribution, increased activity and higher molecular weights than achievable with support procedures in the past.

In one embodiment a method is provided to produce a supported catalyst system by contacting a porous carrier with a organometallic compound then adding at least one metallocene followed by a cocatalyst or activator. In another embodiment the cocatalyst or activator is alumoxane or an ionic activator.

In still yet another embodiment of the invention, there is provided a process for producing polyolefins by contacting olefin monomer, optionally with comonomer in the presence of the catalyst system above.

DETAILED DESCRIPTION OF THE INVENTION

Introduction

This invention is generally directed toward a supported catalyst system useful for polymerizing olefins. The method for supporting the catalyst of the invention provides for a supported metallocene catalyst able to produce polymers having broader molecular weight distribution and a higher molecular weight. Not only are such polymers easily processable as compared with metallocene polymers produced with other support methods but the methods of this invention in some embodiments provide for a supported catalyst with increased activity.

Catalyst Systems and Methods For Their Production

In one embodiment of the invention, the supported catalyst system is formed by contacting porous carrier with an organo-metallic compound then adding the metallocene followed by the addition of a cocatalyst or activator for the metallocene.

For the purposes of this patent specification the term "metallocene" is defined to contain one or more cyclopentadienyl moiety in combination with a transition metal of the Periodic Table of Elements. The metallocene catalyst component is represented by the general formula $(Cp)_m MR_n R'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1-20 carbon atoms; m=1-3, n=0-3, p=0-3, and the sum of m+n+p equals the oxidation state of M. In another embodiment the metallocene catalyst component is represented by the formulas:

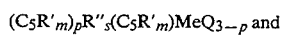

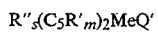

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is a carbon, a germanium, a silicon, a phosphorous or a nitrogen atom containing radical substituting on and bridging two $(C_5R'_m)$ rings, each Q which can be the same or different is an aryl, alkyl, alkenyl, alkylaryl, or arylalkyl radical having from 1 to 20 carbon atoms or halogen, Q' is an alkylidene radical having from 1-20 carbon atoms, s is 0 or 1 and when s is 0, m is 5 and p is 0, 1 or 2 and when s is 1, m is 4 and p is 1. Various forms of the catalyst system of the metallocene type may be used in the polymerization process of this invention. Exemplary of the development of these metallocene catalysts for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. There are a variety of methods for preparing alumoxane one of which is described in U.S. Pat. No. 4,665,208. Other cocatalysts may be used with metallocenes, such as trialkylaluminum compounds, or ionizing ionic activators or compounds such as tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0520 732, EP-A-0 277 003 and EP-A-0 277 004 published Aug. 3, 1988, and U.S. Pat. Nos. 5,153,157 and 5,198,401 and are all herein fully incorporated by reference. Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257 all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. All the catalyst systems described above may be, optionally, prepolymerized or used in conjunction with an additive or scavenging component to enhance catalytic productivity.

For purposes of this patent specification the term "porous carrier" can be any porous support such as talc, inorganic oxides, and resinous support materials such as polyolefin. Suitable inorganic oxide materials which are desirably employed include from the Periodic Table of Elements Groups II, III, IV or V metal oxides such as silica, alumina, silica-alumina, and mixtures thereof. Other inorganic oxides that may be employed either alone or in combination with the silica, alumina or silica-alumina are magnesia, titania, zirconia, and the like. Other suitable support materials can be employed such as, finely divided polyolefins, such as polyethylene.

The specific particle size of the support or inorganic oxide, surface area, pore volume, and number of hydroxyl groups are not critical to its utility in the practice of this invention. However, such characteristics determine the amount of support to be employed in preparing the catalyst compositions, as well as affecting the properties of polymers formed. The characteristics of the carrier or support must therefore be taken into consideration in choosing the same for use in the particular invention.

The organometallic compounds are from those compounds of Group I, II, III and IV of the Periodic Table of Elements. The preferred organometallic compounds are lithium alkyls, magnesium alkyls, magnesium alkyl halides, aluminum alkyls, silicon alkyl, silicon alkoxides and silicon alkyl halides. The more preferred organometallic compounds are aluminum alkyls and magnesium alkyls. The most preferred organometallic compounds are aluminum alkyls, for example, triethylaluminum (TEAL), trimethylaluminum (TMAL), triisobutylaluminum (TIBAL) and tri-n-hexylaluminum (TNHAL) and the like.

It is preferred that the catalyst of the invention is prepared by first treating the carrier or support with an organometallic compound and then depositing the metallocene on the support. The coating material is then added and final product is dried to free-flowing powder. The porous carrier utilized in the invention have surface active sites such as labile protons of the carrier, for example, hydroxyl and/or water groups. Preferably, these surface sites are reacted stoichiometrically with the organometallic compound. In another embodiment of this invention the organometallic compound is reacted with the surface active sites in a ratio less than or equal to about 2.5 moles of the organometallic compound per mole of the active surface site, more preferably, a ratio of less than or equal to about 2:1 is used, and even more preferably a ratio of less than or equal to about 1:1 is used, still even more preferably, a ratio in the range of about 0.5:1 to about 2:1 and most preferably about 0.9:1 to about 2:1.

Figure 1A:
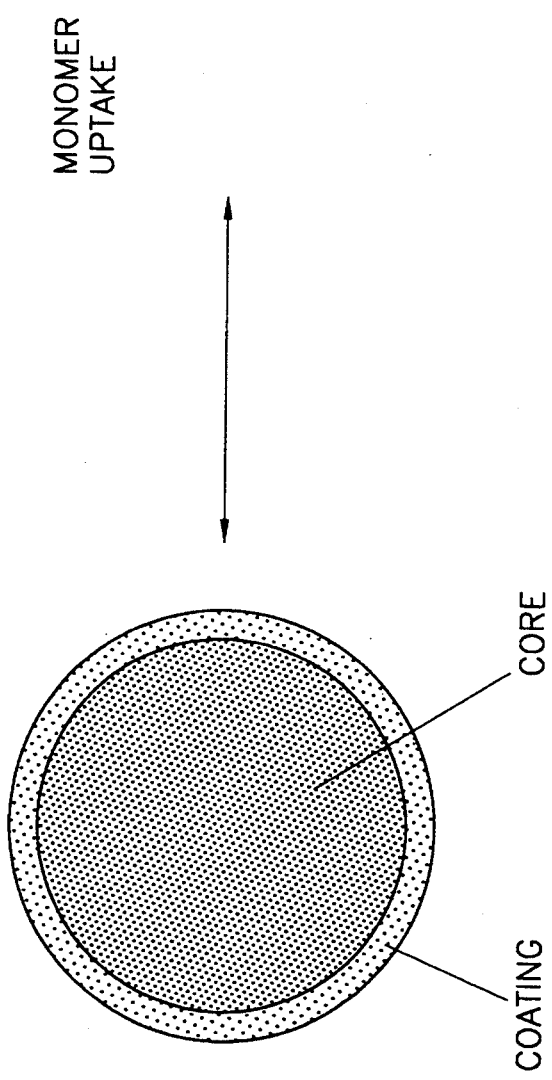
Figure 1B:
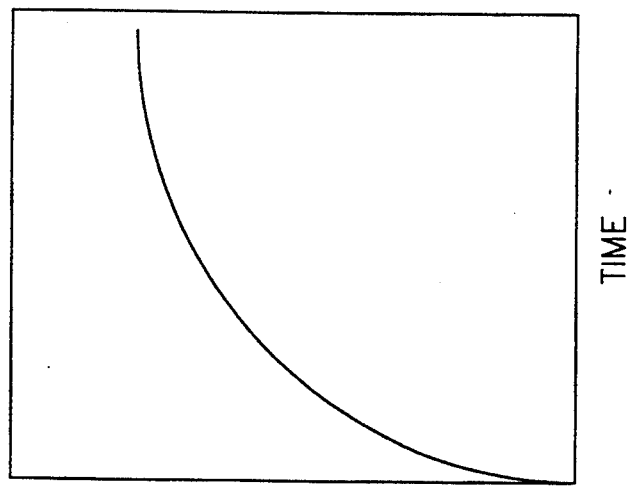
Figure 1B:
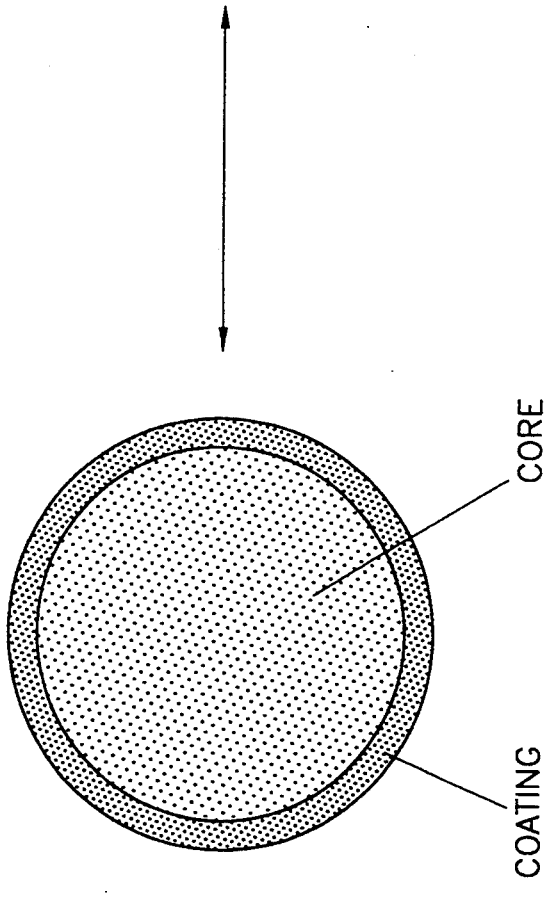

Now referring to FIG. 1, the core comprises a majority of a porous carrier, an organometallic compound and a metallocene, and substantially covering the surface of the core is a coating which comprises a majority of a cocatalyst or activator for the metallocene.

The coating can be any activator or cocatalyst for the metallocene catalyst. The preferred coating can be an oxy-organoaluminum or other polymeric organoaluminum compounds, preferably, alumoxane, and most preferably, methylalumoxane (MAO).

It is preferred that the core of the catalyst of this invention has a surface area in the range of from about 10 to about 700 m$^2$/g, pore volume in the range of from about 0.1 to about 2.5 cc/g and average particle size in the range of from about 10 to about 500μ. More preferably, the surface area is in the range of from about 50 to about 500 m$^2$/g, pore volume of from about 0.5 to about 2.0 cc/g and average particle size of from about 20 to about 200 μm. Most preferably the surface area range is from about 200 to about 400 m$^2$/g, pore volume from about 0.8 to about 2.0 cc/g and average particle size is from about 30 to about 100 μm. For the purposes of this patent specification the final catalyst comprises the core and the coating. The core generally contains between about 5 to about 95 wt % of the final catalyst and the coating will range from about 5 to about 95 wt % of the catalyst; preferably the core comprises about 75 to about 90 wt % of the final catalyst and the coating from about 20 to about 25 wt % and most preferably the core contains from about 80 to about 90 wt % and the coating from about 10 to about 20 wt %.

The loading of the elements in the core, the organometallic, metallocene and the cocatalyst and/or activator can be determined by typical elemental analysis techniques such as ICPES, XRF, and the like.

In one embodiment of the invention the metallocene catalyst of this invention can be used in combination with at least one other metallocene well known in the art to further control the properties of the polymer desired. It is preferred that a ratio of the catalyst of this invention to the other catalyst is preferably 1:19 to 19:1, more preferably 1:3 to 3:1, still more preferably 1:2 to 2:1 and most preferably 1:1.

FIG. 1 illustrates that the supported catalyst of the invention provides for better control over the behavior of the catalyst in a polymerization environment, i.e., heat of reaction at the catalyst site can be better controlled. For example, at constant reaction temperature and pressure, the graph in FIG. 1 shows a slower rate of initial monomer uptake as a function of reaction time for the catalyst of this invention.

EXAMPLES

In order to provide a better understanding of the invention including representative advantages thereof, the following examples and tables illustrating the examples are offered. For the purposes of this patent specification, the designation of (1,2/1,3-MeEtCp)$_2$ZrCl$_2$ is illustrative of one embodiment of a catalyst of the invention, which is a mixture of (1,2-methyl ethyl Cp)$_2$ZrCl$_2$, (1,3-methyl ethyl Cp)$_2$ZrCl$_2$ and (1,2-methyl ethyl Cp)(1,3-methyl ethyl Cp)ZrCl$_2$.

Density is measured in accordance with ASTM-D-1238. The ratio of Mw/Mn can be measured directly by gel permeation chromatography techniques, or indirectly, by measuring the ratio of I$_{21}$ to I$_2$ as described in ASTM-D-1238-F and ASTM-D-1238-E respectively.

For the purposes of this patent specification the MWD of a polymer is determined with a Waters Gel Permeation Chromatograph equipped with Ultrastyrogel columns and a refractive index detector. In this development, the operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

EXAMPLE 1

Preparation of supported ($^n$BuCp)$_2$ZrCl$_2$ Catalyst 27.7 g of Davison 948 silica dried to 200° C. was slurried in 200 cm$^3$ heptane in a reaction flask. The flask was cooled to 0° C. and 58 cm$^3$ of 10 wt % trimethyl aluminum solution in iso-pentane was added slowly. The reaction was allowed to proceed for 1 h and then the temperature was raised to 65° C. Then a solution of 1.228 g ($^n$BuCp)$_2$ZrCl$_2$ in toluene was added slowly. After 1 h, 53 cm$^3$ of 30 wt % methylalumoxane solution in toluene was added and the reaction allowed to proceed for another 1 h before drying the final catalyst to free-flowing powder under vacuum. This method of preparing the catalyst illustrate the invention.

Polymerization Test

The silica supported catalyst as prepared above was tested for ethylene/1-hexene co-polymerization in a continuous fluid bed gas-phase reactor operated at 300 psig (2.17 MPa) total pressure, 65° C. reactor temperature and 0.7 ft/s (21.3 cm/s) cycle gas velocity. The catalyst was fed at a rate that maintained a constant rate of product discharge from the reactor. The reactor gas mixture was composed of 45% ethylene, 0.5% 1-hexene and 400 ppm H$_2$ with the balance being nitrogen.

EXAMPLE 2

Preparation of supported ($^n$BuCp)$_2$ZrCl$_2$ Catalyst 10 g of Davison 948 silica dried to 200° C. was slurried in 50 cm$^3$ toluene in a reaction flask. The flask was cooled to 0° C. and 56 cm$^3$ of 10 wt % methylalumoxane in toluene was added. After 0.5 h, the temperature was raised to 65° C. and maintained for 1.5 h. Then a toluene solution of 0.338 g ($^n$BuCp)$_2$ZrCl$_2$ was added slowly. The reaction condition was maintained for 1 h and then the resultant catalyst was dried to free-flowing powder under reduced pressure. The catalyst was tested for the co-polymerization of ethylene/1-hexene as described in Example 1 with a reactor gas composition of 43% ethylene, 0.3% hexene-1 and 375 ppm $H_2$.

EXAMPLE 3

Preparation of supported ($^i$PrCp)$_2$ZrCl$_2$ Catalyst 30 g of Davison 948 silica dried to 200° C. was slurried in 200 cm$^3$ heptane in a reaction flask. The flask was cooled to 0° C. and 63 cm$^3$ of 10 wt % trimethyl aluminum solution in iso-pentane was added slowly. The reaction was allowed to proceed for 1 h and then the temperature was raised to 65° C. Then a solution of 1.251 g ($^i$PrCp)$_2$ZrCl$_2$ in toluene was added slowly. After 1.5 h, 59 cm$^3$ of 30 wt % methylalumoxane solution in toluene was added and the reaction allowed to proceed for another 1 h before drying the final catalyst to free-flowing powder under vacuum. This method of preparing the catalyst illustrates the invention. The catalyst was tested for the co-polymerization of ethylene/1-butene in a semi-batch gas-phase reactor at 85° C. The pressure in the reactor was held constant by continuously feeding 5 mol-% 1-butene in ethylene to compensate for any pressure change due to polymerization. After 0.5 h, the polymer formed was separated from the seed bed material and analyzed for resin molecular properties shown in Table 1.

EXAMPLE 4

Preparation of supported ($^i$PrCp)$_2$ZrCl$_2$ Catalyst 212 g of Davison 948 silica dried to 200° C. was slurried in 1500 cm$^3$ heptane in a reaction flask. The flask was cooled to 0° C. and 370 cm$^3$ of 30 wt % methylalumoxane in toluene was added. After 0.5 h, the temperature was raised to 70° C. and maintained for 3 h. Then a toluene solution of 8 g ($^i$PrCp)2ZrCl$_2$ was added slowly. The reaction condition was maintained for 1 h and then the resultant catalyst was dried to free-flowing powder under reduced pressure. The catalyst was tested for the co-polymerization of ethylene/1-butene as described in Example 3.

EXAMPLE 5

Preparation of supported ($^i$PrCp)$_2$ZrCl$_2$ Catalyst 10 g of Davison 948 silica dried to 200° C. was slurried in 100 cm$^3$ toluene in a reaction flask. Then 4.5 g dried MAO solid was dissolved in 60 cm$^3$ toluene and added to the silica slurry at 25° C. After 0.5 h, the temperature was raised to 70° C. and maintained for 3.5 h. Then a toluene solution of 0.368 g ($^i$PrCp)$_2$ZrCl$_2$ was added slowly. The reaction condition was maintained for 1 h and then the resultant catalyst was dried to free-flowing powder under reduced pressure. The catalyst was tested for the co-polymerization of ethylene/1-butene as described in Example 3.

EXAMPLE 6

Preparation of supported ($^i$PrCn)$_2$ZrCl$_2$ Catalyst 20 g Davison 948 silica having Loss-On-Ignition (LOI) value of 9.5 wt % was added slowly to 37 cm$^3$ of 15 wt % trimethyl aluminum solution in heptane in a reaction flask at 5° C. After all the silica had been added the slurry was allowed to warm up to 22° C. and this was maintained for 1 h. Then 36 cm$^3$ 30 wt % MAO solution in toluene was added and then the temperature was raised to 70° C. and maintained for 4 h. Then a toluene solution of 0.809 g ($^i$PrCp)2ZrCl$_2$ was added slowly. The reaction condition was maintained for 1.5 h and then the resultant catalyst was dried to free-flowing powder under reduced pressure. The catalyst was tested for the co-polymerization of ethylene/1-butene as described in Example 3.

EXAMPLE 7

Preparation of supported {(1,2/1,3-MeEtCp)$_2$ZrCl$_2$($^n$PrCp)$_2$ZrCl$_2$}

40 g of Davison 948 silica dried to 200° C. was slurried in 250 cm$^3$ heptane in a reaction flask. Then 51 cm$^3$ of 30 wt % MAO solution in toluene was added at 0° C. After 0.5 h, the temperature was raised to 70° C. and maintained for 4 h. Then a toluene solution of 0.679 g (1,2/1,3-MeEtCp)$_2$ZrCl$_2$ mixed with 0.226 g ($^n$PrCp)$_2$ZrCl$_2$ was added slowly followed by a 1 h hold of the reaction conditions. The final catalyst was dried to free-flowing powder under vacuum. The catalyst was tested for the co-polymerization of ethylene/1-butene as described in Example 3.

EXAMPLE 8

Preparation of supported {(1,2/1,3-MeEtCp)$_2$ZrCl$_2$/($^n$PrCp)$_2$ZrCl$_2$}

50 g of Davison 948 silica dried to 200° C. was slurried in 300 cm$^3$ heptane in a reaction flask. The flask was cooled to 0° C. and 64 cm$^3$ of 15 wt % trimethyl aluminum solution in heptane was added slowly. The reaction was allowed to proceed for 1 h and then the temperature was raised to 70° C. Then a toluene solution of 1.18 g (1,2/1,3-MeEtCp)$_2$ZrCl$_2$ mixed with 0.393 g ($^n$PrCp)$_2$ZrCl$_2$ was added slowly followed by a 1 h hold of the reaction conditions. 94 cm$^3$ of 30 wt % methylalumoxane solution in toluene was added and the reaction allowed to proceed for another 3 h before drying the final catalyst to free-flowing powder under vacuum. This method of preparing the catalyst illustrate the invention. The catalyst was tested for the co-polymerization of ethylene/1-butene as described in Example 3.

While the present invention has been described and illustrated by reference to particular embodiments, it will be appreciated by those of ordinary skill in the art that the invention lends itself to variations not necessarily illustrated herein. For example, it is not beyond the scope of this invention to include at least two metallocene catalysts or further supporting the catalyst of the invention. For this reason, then, reference should be made solely to the appended claims for purposes of determining the true scope of the present invention.

TABLE 1

| | ($^n$BuCp)$_2$ZrCl$_2$ | | | | | |
|---|---|---|---|---|---|---|
| Example | Catalyst Activity | Density | $I_{21}$ | $M_w$ | $M_w/M_n$ | Note |
| 1 | 1280 | 0.9301 | 12.7 | 51600 | 3.1 | 1 |
| 2 | 500 | 0.9370 | 19.6 | 43400 | 2.4 | 2 |

1. {[SiO$_2$ + TMA] + ($^n$BuCp)$_2$ZrCl$_2$} + MAO (Invention)
2. {SiO$_2$ + MAO} + ($^n$BuCp)$_2$ZrCl$_2$ (Comparative)

TABLE 2

| | ($^i$PrCp)$_2$ZrCl$_2$ | | | |
|---|---|---|---|---|
| Example | Catalyst Activity | $M_w$ | $M_w/M_n$ | Note |
| 3 | 416 | 84300 | 7.6 | 1 |
| 4 | 476 | 82200 | 5.0 | 2 |
| 5 | 264 | 68000 | 5.9 | 3 |

TABLE 2-continued

| | ($^i$PrCp)$_2$ZrCl$_2$ | | | |
|---|---|---|---|---|
| Example | Catalyst Activity | M$_w$ | M$_w$/M$_n$ | Note |
| 6 | 513 | 88200 | 5.7 | 4 |

1. {[SiO$_2$ + TMA] + ($^i$PrCp)$_2$ZrCl$_2$} + MAO (Invention)
2. {SiO$_2$ + MAO} + ($^i$PrCp)$_2$ZrCl$_2$ (Comparative)
3. {SiO$_2$ + Dried-MAO} + ($^i$PrCp)$_2$ZrCl$_2$ (Comparative)
4. {[TMA + SiO$_2$] + MAO} + ($^i$PrCp)$_2$ZrCl$_2$ (Comparative)

TABLE 3

| Example | Metallocene(s) | Catalyst Activity | Density | I$_{21}$ | I$_{21}$/I$_2$ | M$_w$ | M$_w$/M$_n$ | Note | Alkyl Type |
|---|---|---|---|---|---|---|---|---|---|
| 7 | (1,2/1,3-MeEtCp)$_2$ZrCl$_2$ + ($^n$PrCp)$_2$ZrCl$_2$ | 1027 | 0.9237 | 2.4 | 19.8 | 82300 | 3.0 | 1 | — |
| 8 | (1,2/1,3-MeEtCp)$_2$ZrCl$_2$ + ($^n$PrCp)$_2$ZrCl$_2$ | 907 | 0.9193 | 0.7 | 32.0 | 103200 | 4.9 | 2 | TMAL |

1 {SiO$_2$ + MAO} + Metallocene(s) (Comparative)
2 {[SiO$_2$ + Aluminum Akyl] + Metallocene(s)} + MAO (Invention)

We claim:

1. A method to produce a supported catalyst system comprising the steps of:
   a) contacting a porous inorganic carder with an organometallic compound, said porous inorganic carder having labile protons;
   b) adding at least one metallocene of Group 4, 5, or 6; and
   c) adding a cocatalyst or an activator for said metallocene, wherein the mole ratio of the organometallic compound to the labile protons of said carder is less than 2:1.

2. The method according to claim 1 wherein said cocatalyst or activator is an alumoxane.

3. The method according to claim 1 wherein said cocatalyst or activator is an ionic activator.

4. The method according to claim 1 wherein said organometallic compound is a compound of Group I, II, III, and IV of the Period Table of Elements.

5. The method according to claim 1 wherein said organometallic compound is selected from the group consisting of aluminum alkyls, magnesium alkyls, magnesium alkyl halides, lithium alkyls and silicon alkyls, silicon alkoxides and silicon alkyl halides.

6. The method according to claim 1 wherein said porous carrier is an inorganic oxide or polymeric supports or combinations thereof.

7. The method according to claim 1 wherein said metallocene is represented by the formulas:

$$(CSR'_m)_p R''_s (CSR'_m) MeQ_{3-p} \text{ and}$$

$$R''_s (C_5R'_m)_2 MeQ'$$

wherein Me is a Group 4, 5, 6 transition metal, C$_5$R'$_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a C$_4$ to C$_6$ ring, R" is a carbon, a germanium, a silicon, a phosphorous or a nitrogen atom containing radical substituting on and bridging two (C$_5$R'$_m$) rings, each Q which can be the same or different is an aryl, alkyl, alkenyl, alkylaryl, or arylalkyl radical having from 1 to 20 carbon-atoms or halogen, Q' is an alkylidene radical having from 1–20 carbon atoms, s is 0 or 1 and when s is 0, m is 5 and p is 0, 1 or 2 and when s is 1, m is 4 and p is 1.

8. The method according to claim 1 wherein said porous carrier is silica, or alumina or mixtures thereof.

9. The method according to claim 1 wherein the mole ratio of said organometallic compound to the labile protons of said porous carrier is in the range of about 0.5:1 to equal to about 1:1.

* * * * *